United States Patent
Stenfelt

(10) Patent No.: US 8,396,763 B2
(45) Date of Patent: Mar. 12, 2013

(54) CREDIT AUTHORIZATION IN A CORE NETWORK

(75) Inventor: John Stenfelt, Göteborg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 12/996,427

(22) PCT Filed: Dec. 22, 2008

(86) PCT No.: PCT/EP2008/068141
§ 371 (c)(1),
(2), (4) Date: Dec. 6, 2010

(87) PCT Pub. No.: WO2009/149775
PCT Pub. Date: Dec. 17, 2009

(65) Prior Publication Data
US 2011/0082776 A1 Apr. 7, 2011

Related U.S. Application Data

(60) Provisional application No. 61/060,585, filed on Jun. 11, 2008.

(51) Int. Cl.
G07B 17/00 (2006.01)
G07F 19/00 (2006.01)
(52) U.S. Cl. .................................................. 705/30
(58) Field of Classification Search .................. 705/30
See application file for complete search history.

(56) References Cited

U.S. PATENT DOCUMENTS

| | | | |
|---|---|---|---|
| 2007/0281699 A1* | 12/2007 | Rasanen | 455/436 |
| 2008/0046963 A1* | 2/2008 | Grayson et al. | 726/1 |
| 2008/0229385 A1* | 9/2008 | Feder et al. | 726/1 |
| 2009/0141625 A1* | 6/2009 | Ghai et al. | 370/230 |
| 2010/0150003 A1* | 6/2010 | Andreasen et al. | 370/252 |
| 2010/0214977 A1* | 8/2010 | Hegde | 370/328 |
| 2010/0272115 A1* | 10/2010 | Ramankutty | 370/401 |

OTHER PUBLICATIONS $3^{rd}$ Generation Partnership Project; Technical Specification Group Core Network and Terminals; Policy and Charging Control over Gx Reference Point, ETSI Standards; 3GPP TS 29.212 v8.0.0, May 2008.

* cited by examiner

*Primary Examiner* — Seye Iwarere

(57) ABSTRACT

A node for a telecommunications system, comprising a PCEF and interfaces towards a BERF, a PCRF, and an OCS, an Online Charging System. The node is equipped with a function for sending a credit authorization request and event information to the OCS, and for receiving, in reply, a credit authorization trigger from the OCS. The node also comprises a function for forwarding such credit authorization triggers to the PCRF and for receiving from the PCRF acknowledgment of installation in the BBERF and information regarding the events for which credit is sought. The node comprises a function for receiving the result of a comparison between the event information that was sent to the OCS and the event information that was received from the BBERF; if those two are not similar, the credit authorization is not considered completed.

10 Claims, 4 Drawing Sheets

CREDIT AUTHORIZATION IN A CORE NETWORK

This application claims the benefit of U.S. Provisional Application No. 61/060,585, filed Jun. 11, 2008, the disclosure of which is fully incorporated herein by reference.

TECHNICAL FIELD

The present invention discloses a node and a method for improved credit authorization in a core network.

BACKGROUND

In cellular telecommunication systems such as 3GPP-based systems (e.g. the EPS and 2G/3G-GPRS) or non-3GPP based systems (e.g. HRPD and WiMax) that employ dynamic Policy and Charging Control (PCC), there is a function known as the PCEF, Policy Charging and Enforcement Function. The PCEF interacts with a function in the system known as the OCS, the Online Charing System, suitably over an interface known as the Gy interface.

In addition, the PCEF also interacts with another function, known as the PCRF, the Policy and Charging Rules Function, which is suitably done over an interface known as the Gx interface.

In recent updates of the 3GPP specifications, a node known as the BBERF, the Bearer Binding and Event Reporting Function, has been introduced. The BBERF performs so called bearer management in the Access Network, and carries out event reporting to the PCRF over an interface known as the Gxx interface. The BBERF interacts with the PCEF via an interface known as the S5/S8 interface that is based on Proxy Mobile IP, PMIP, protocol.

The PMIP protocol is only capable of providing the PCEF with limited information regarding session related events in the system events which the OCS uses as input when performing so called credit authorization.

Since the Gy interface terminates at the PCEF, the limited information regarding events in the system which can be provided to the PCEF from the BBERF will also reflect on the information which can be provided to the OCS, which may be a source of problems.

SUMMARY

As has been described above, there is a need for improved information exchange in a system of the kind which has been described above, i.e. a 3GPP-based system with a PMIP based EPC or a non-3GPP based access connected to a PMIP based EPC, Evolved Packet Core.

This need is addressed by the present invention in that it discloses a node for a telecommunications system which comprises functions for Policy and Charging Enforcement Functions in the system, so called PCEF.

The node of the invention is equipped with interfaces towards functions in the network for the following functions:
BBERF, a Bearer Binding and Event Reporting Function,
PCRF, a Policy and Charging Rules Function,
OCS, an Online Charging System.

In addition, the node of the invention is equipped with a function for sending a credit authorization request and event information to the OCS, and for receiving, in reply, a credit authorization trigger from the OCS.

The inventive node also comprises a function for forwarding credit authorization triggers from the OCS to the PCRF and for receiving from the PCRF an acknowledgment of installation of the triggers in the BBERF together with information regarding the events for which credit is sought.

According to the invention, the node comprises a function for receiving the result of a comparison between the event information that was sent to the OCS and the event information that was received from the BBERF, and if those two are not similar, the receiving function in the node will not consider the credit authorization completed.

Thus, by means of the invention, credit authorization will only be deemed to be completed if the same information regarding an event is to be found in both the OCS and the BBERF.

In one embodiment, the node of the invention additionally comprises a function for carrying out the comparison between the event information from the OCS and the event information from the BBERF, and for providing the result of that comparison to the function in the PCEF for receiving the result of the comparison.

In one embodiment of the invention, if the event comparison between the information from the OCS with the event information from the BBERF shows that the two are sufficiently dissimilar, the node of the invention comprises a function for providing the event information from the BBERF to the OCS in a credit request, which will thus eventually trigger another comparison in the node of the invention.

In one embodiment, the function for sending a credit authorization request and event information to the OCS triggers a new credit authorization request to the OCS if a credit authorization is not considered completed.

The node of the invention may be the PCEF as such, or it may be another node which comprises a PCEF function, in which case the node is suitably a so called PDN GW, a Packet Data Network Gate Way, although the node may also be another node in a telecommunications system.

The invention also discloses a corresponding method.

BRIEF DESCRIPTION OF THE DRAWINGS

The invention will be described in more detail in the following, with reference to the appended drawings, in which.

DETAILED DESCRIPTION

Figure 1:
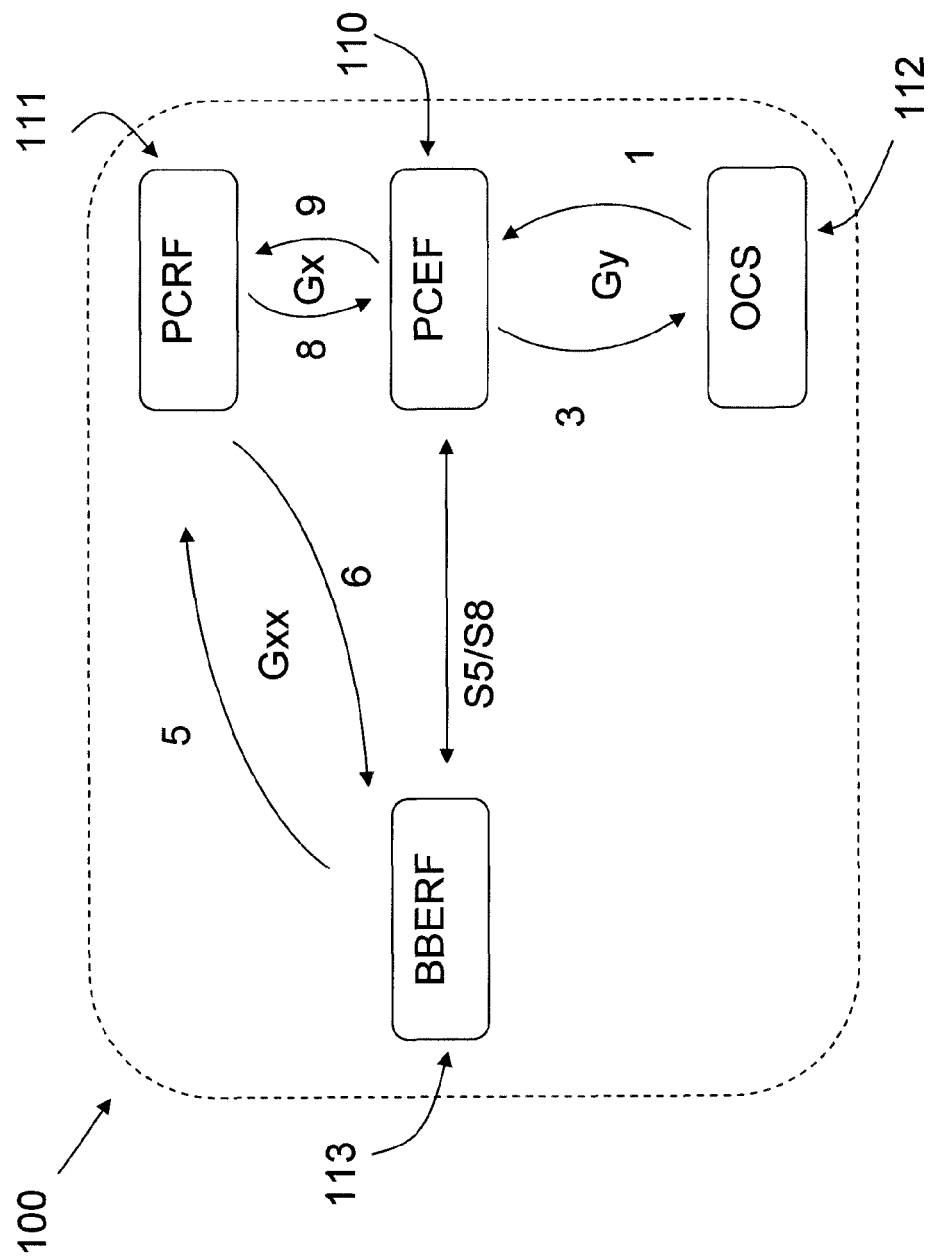
FIG. 1 shows an overview of a system in which the invention can be applied.

FIG. 1 shows a system overview of a system 100 in which the present invention can be applied. The system 100 will be explained briefly here in order to facilitate the understanding of the present invention.

It should be pointed out that FIG. 1 shows the system in terms of functionalities and not physical blocks as such, so the functions shown in FIG. 1 may be located in different physical units, or one or more of the functions shown in FIG. 1 may be co-located in one and the same physical unit; the present invention may be applied in all such embodiments of the system 100.

The physical units used to implement the functionalities described herein include at least one microprocessor coupled to a non-transitory computer-readable medium. The non-transitory computer-readable medium further includes computer-readable instructions, when executed by the at least one microprocessor, implements the methods and functionalities described herein.

Turning now to FIG. 1, there is shown a function 113 known as the BBERF, the Bearer Binding and Event Reporting.

In the system 100, there is also a function 110 known as the PCEF, Policy and Charging Enforcement Function. As the name implies, one of the roles the PCEF 110 has in the system 100 is to administer the charging and control of services for individual users in the system 100.

The PCEF interfaces the BBERF via an interface known as the S5/S8 interface. This interface may be based either on GTP, GPRS Tunnelling Protocol, or on a Mobile IP based protocol, e.g. PMIP.

If a Mobile IP protocol is used between an Access Gateway, e.g. the Serving Gateway and a PDN Gateway, the PCEF has no knowledge of the bearers of user sessions, and can consequently not tie individual services to bearers. In such a network scenario, it is the BBERF that has the role of resource manager and in addition performs the binding of a service to a bearer for sessions of the individual users in the system 100.

Another function that is shown in the system 100 is a function 111 known as the PCRF, the Policy and Charging Rules Function. As the name implies, a function of the PCRF is to keep track of which policies that apply to individual users in the system, as well as to keep track of the charging rules that apply to those users.

The PCRF interfaces with the BBERF via an interface known as the Gxx interface, while the interface between the PCRF and the PCEF is known as the Gx interface.

Also included in the system 100 is a function 112 known as the OCS, the Online Charging System. One of the roles of the OCS is to authorize credits for individual users in the system, when a user, for example, initiates a new service. The interface between the OCS 112 and the PCEF 110 is known as the Gy interface.

At the various interfaces in FIG. 1, traffic or the exchange of information is indicated by means of numbers. Below, a list of examples of such traffic or information will be given, with the numbers below corresponding to those indicated at the interfaces in FIG. 1.

| Interface | Number | Information/traffic |
| --- | --- | --- |
| Gy | 1 | Event triggers, credits, credit re-authorization, credit responses. |
|  | 3 | Events, credit requests/reports |
| Gx | 8 | Event triggering, rules |
|  | 9 | Events |
| Gxx | 6 | Event triggering, rules |
|  | 5 | Events, |
| S5 or PMIP |  | Data, limited information on mobility |

Since the information which is exchanged between the PCEF and the BBERF is limited, the problem arises that the PCEF is unable to monitor all of the credit events that the OCS authorises over the Gy, and is thus unable to decide when credit authorization should be considered complete. This is a problem that is addressed the invention, in a manner which will be explained below, with reference to FIG. 2.

Figure 2:
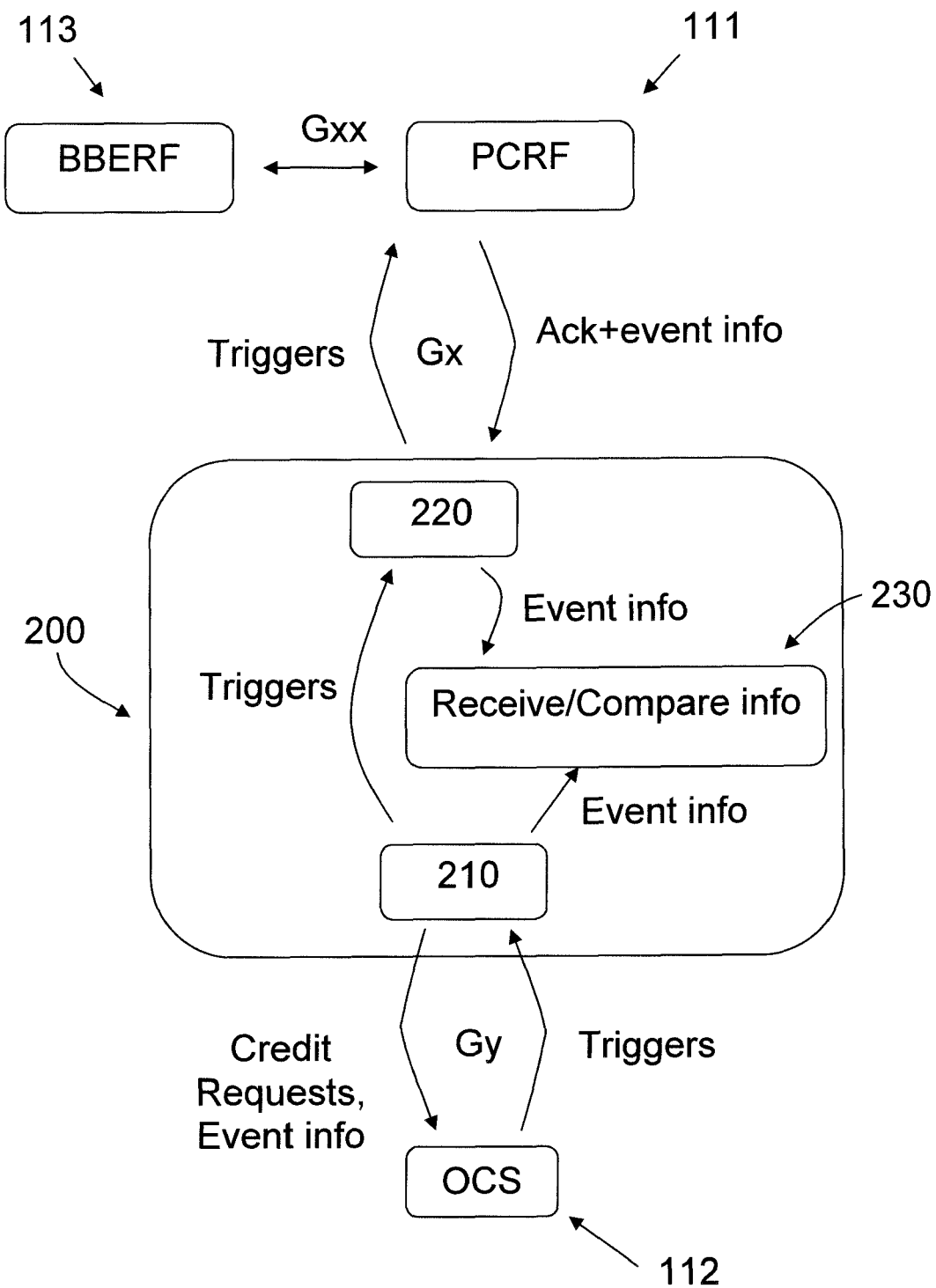
FIG. 2 shows one embodiment of a function of the invention and the surrounding system.

The invention discloses a node, suitably a PCEF, shown as 200 in FIG. 2, for use in a cellular telecommunications network. The node of the invention may thus be the PCEF as such, or it may be another node which comprises a PCEF function, in which case the node is suitably a so called PDN GW, a Packet Data Network Gate Way, although the node may also be another node in a telecommunications system.

The node of the invention has interfaces towards the following other nodes in the system, which have also retained their reference numbers from FIG. 1:

BBERF, a Bearer Binding and Event Reporting Function,
PCRF, a Policy and Charging Rules Function,
OCS, an Online Charging System As indicated in FIG. 2, the node 200 of the invention is equipped with a function 210 for sending credit authorization requests and event information to the OCS, and for receiving in reply, a credit authorization trigger from the OCS.

In addition, the node 200 of the invention also comprises a function 220 for forwarding such credit authorization triggers to the PCRF and for receiving from the PCRF an acknowledgment of installation of the triggers in the BBERF together with information regarding the events for which credit is sought.

Furthermore, the inventive node also comprises a function 230 for receiving the result of a comparison between the event information that was sent to the OCS and the event information from the BBERF. If those two, i.e. the event information to the OCS and the event information from the BBERF are not similar, the function 230 in the node will not consider the credit authorization completed.

The comparison between the event information provided to the OCS and the event information from the BBERF can be carried out in a function for this in the node as such, i.e. in one embodiment, the inventive node, which is suitably the PCEF, additionally comprises a function for carrying out the comparison between the event information provided to the OCS and the event information from the BBERF, and for providing the result of that comparison to the function 230 in the PCEF which is intended to receive the result of the comparison.

The "comparing function" can in one embodiment be a part of the function 230, or, alternatively, in another embodiment of the invention, it can be a separate function.

In another embodiment, the comparison is carried out in the PCRF, so that the function 230 in the inventive node for receiving the result of a comparison between the event information from the OCS and the event information from the BBERF is adapted to receive this result from the PCRF.

In another embodiment, the comparison is carried out in the BBERF, so that the function 230 for receiving the result of a comparison between the event information from the OCS and the event information from the BBERF is adapted to receive this result from the PCRF, which however receives the result of the comparison from the BBERF, where the comparison is carried out.

Figure 3:
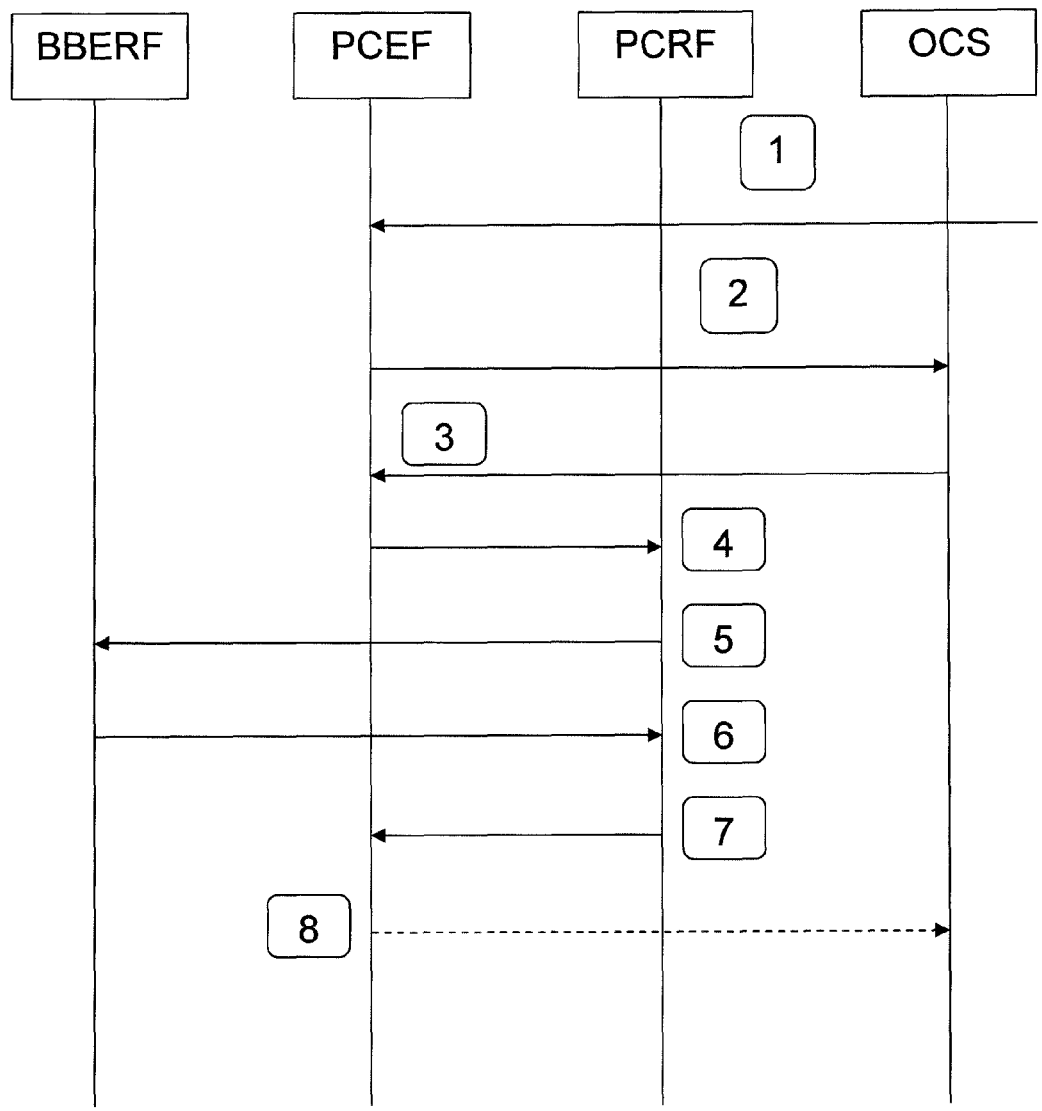
FIG. 3 shows a procedure of an embodiment of the invention.

The invention will be explained further by means of the event diagram of FIG. 3, in which the reference numbers of the various events are explained in the text below:

1. The PCEF detects a new service used by a user in the system by means of packet inspection or by means of service authorization (for the new service) over the Gx interface.
2. The PCEF sends a credit authorization request to the OCS for the new service, by means of the function 210 shown in FIG. 2.
3. The credit authorization reply is received from the OCS by the function 210 in the PCEF and comprises a credit authorization trigger.
4. The PCEF, using the function 220, initiates a Gx update request, i.e. a policy control request over the Gx interface, to the PCRF, and provides the PCRF with the trigger from the OCS. The credit authorization is as yet not considered by the PCEF to be completed, no charging is carried out for the new service; this can however be done retroactively at a later stage.

5. The PCRF provides the trigger to the BBERF over the Gxx interface.
6. The BBERF installs the triggers, acknowledges this to the PCRF and provides the PCRF with the current event information in the BBERF related to the newly installed triggers.
7. The PCRF forwards the acknowledgment of the installed triggers in the BBERF to the PCEF, as well as the current event information. The function 230 in the PCEF 200 can now compare the current event information from the BBERF to the current event information in the PCEF, or receive the result of such a comparison.
8. If the comparison yields a "positive" result, after e.g. by being carried out in the function 230, the PCEF then considers the credit authorization procedure for the newly discovered event to be completed. If, however, the comparison shows that the event information from the BBERF is not similar to the event information in the PCEF, the PCEF triggers a new credit authorization over the Gy interface to the OCS.

As has been mentioned, the comparison can in other embodiments of the invention also be carried out in the PCRF or in the BBERF. In these cases, the PCEF provides the event information to the PCRF in step 4 above, and the PCRF can then either request the corresponding information from the BBERF in step 5 and then carry out the comparison, or the PCRF can forward the information to the BBERF in step 5, and receive the outcome of the comparison in step 6 above; in both cases, the result of the comparison is forwarded from the PCRF to the PCEF in step 7 above.

Figure 4:
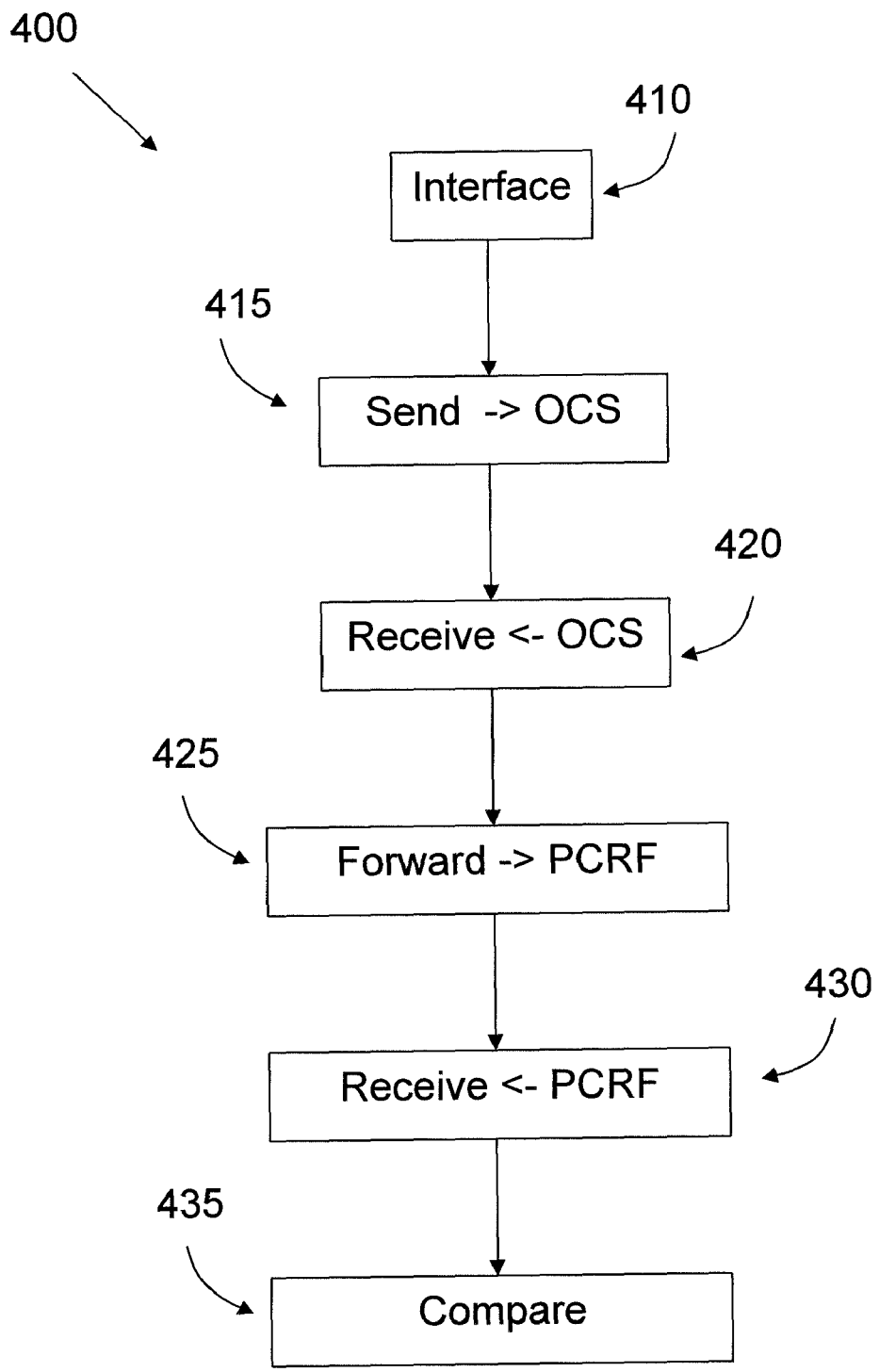
FIG. 4 shows a flow chart of an embodiment of the invention.

FIG. 4 shows a flow chart of steps of a method 400 of the invention. As has also emerged from the description above, the method 400 is intended for use in a Policy and Charging Enforcement Function, a PCEF, in a telecommunications network, and, as indicated in FIG. 4, the method 400 comprises letting, as shown in step 410, the PCEF interface, towards functions in the network for:
  BBERF, a Bearer Binding and Event Reporting Function,
  PCRF, a Policy and Charging Rules Function,
  OCS, an Online Charging System.

As also indicated in FIG. 4, the method 400 also comprises the steps of:
  sending, step 415, a credit authorization request and event information to the OCS, and
  receiving, step 420, in reply, a credit authorization trigger from the OCS, and forwarding, step 425, such credit authorization triggers to the PCRF and
  receiving, step 430, from the PCRF an acknowledgment of installation of the triggers in the BBERF together with information regarding the events for which credit is sought.

As indicated in step 430, it also comprises comparing the event information that was sent to the OCS and the event information that was received from the BBERF, and if those two are not similar, the credit authorization is not considered completed.

In one embodiment, the method 400 additionally comprises carrying out the comparison between the event information from the OCS and the event information from the BBERF in the PCEF.

In one embodiment, the method 400 additionally comprises carrying out the comparison between the event information from the OCS and the event information from the BBERF in the PCRF.

In one embodiment, the method 400 additionally comprises carrying out the comparison between the event information from the OCS and the event information from the BBERF in the BBERF.

In one embodiment of the method 400, if a credit authorization is not considered completed, a new credit authorization request is triggered to the OCS.

The invention is not limited to the examples of embodiments described above and shown in the drawings, but may be freely varied within the scope of the appended claims.

The invention claimed is:

1. A node for a telecommunications system, the node comprising functions for Policy and Charging Enforcement Functions in the system, so called PCEF, the node being equipped with interfaces towards functions in the network for:
  BBERF, a Bearer Binding and Event Reporting Function,
  PCRF, a Policy and Charging Rules Function,
  OCS, an Online Charging System,
the node comprising:
at least one microprocessor; and
a non-transitory computer-readable medium including computer-readable instructions, when executed by the at least one microprocessor, are configured for:
  sending a credit authorization request and event information to the OCS, and for receiving, in reply, a credit authorization trigger from the OCS,
  forwarding such credit authorization triggers to the PCRF,
  receiving from the PCRF an acknowledgment of installation of the triggers in the BBERF together with information regarding the events for which credit is sought,
  receiving the result of a comparison between the event information that was sent to the OCS and the event information that was received from the BBERF, and
  in response to determining that the event information that was sent to the OCS and the event information that was received from the BBERF are not similar, determining that the credit authorization is not completed.

2. The node of claim 1, further comprising carrying out, using the at least one microprocessor, the comparison between the event information from the OCS and the event information from the BBERF, and for providing the result of that comparison to the function in the PCEF for receiving the result of the comparison.

3. The node of claim 1, wherein receiving the result of a comparison between the event information from the OCS and the event information from the BBERF further comprises receiving, using the at least one microprocessor, this result from the PCRF, where the comparison is carried out.

4. The node of claim 1, wherein receiving the result of a comparison between the event information from the OCS and the event information from the BBERF further comprises receiving, using the at least one microprocessor, this result from the PCRF, which in turn receives, using the microprocessor, the result from the BBERF, where the comparison is carried out.

5. The node of claim 1, wherein sending a credit authorization request and event information to the OCS triggers a new credit authorization request to the OCS if a credit authorization is not considered completed.

6. A method for use in a Policy and Charging Enforcement Function, a PCEF, in a telecommunications network, comprising the steps of letting the PCEF interface towards functions in the network for:
  BBERF, a Bearer Binding and Event Reporting Function,
  PCRF, a Policy and Charging Rules Function,
  OCS, an Online Charging System,
also comprising the steps of:

sending, using at least one microprocessor, a credit authorization request and event information to the OCS, and receiving, with the at least one microprocessor, in reply, a credit authorization trigger from the OCS, and forwarding, using the at least one microprocessor, such credit authorization triggers to the PCRF and receiving, using the at least one microprocessor, from the PCRF an acknowledgment of installation of the triggers in the BBERF together with information regarding the events for which credit is sought, comparing, using the at least one microprocessor, the event information that was sent to the OCS and the event information that was received from the BBERF, and if the event information that was sent to the OCS and the event information that was received from the BBERF are not similar, the credit authorization is not considered completed.

7. The method of claim 6, further comprising carrying out, using the at least one microprocessor, the comparison between the event information from the OCS and the event information from the BBERF in the PCEF.

8. The method of claim 6, further comprising carrying out, using the at least one microprocessor, the comparison between the event information from the OCS and the event information from the BBERF in the PCRF.

9. The method of claim 6, further comprising carrying out, using the at least one microprocessor, the comparison between the event information from the OCS and the event information from the BBERF in the BBERF.

10. The method of claim 6, according to which, if a credit authorization is not considered completed, a new credit authorization request is triggered, using the at least one microprocessor, to the OCS.

* * * * *

UNITED STATES PATENT AND TRADEMARK OFFICE
CERTIFICATE OF CORRECTION

PATENT NO. : 8,396,763 B2
APPLICATION NO. : 12/996427
DATED : March 12, 2013
INVENTOR(S) : Stenfelt It is certified that error appears in the above-identified patent and that said Letters Patent is hereby corrected as shown below:

On the Title Page, in Item (57), under "ABSTRACT", in Column 2, Line 2, delete "BERF," and insert -- BBERF, --, therefor.

In the Specifications:

In Column 1, Line 21, delete "Charing" and insert -- Charging --, therefor.

In Column 2, Line 43, delete "applied, and" and insert -- applied, --, therefor.

Signed and Sealed this
Second Day of July, 2013

Teresa Stanek Rea
*Acting Director of the United States Patent and Trademark Office*